(12) United States Patent
Mairesse et al.

(10) Patent No.: US 10,576,437 B2
(45) Date of Patent: Mar. 3, 2020

(54) SENSOR SUPPORT FOR A REACTOR UNDERGOING CHARGING

(71) Applicant: TOTAL RAFFINAGE FRANCE, Courbevoie (FR)

(72) Inventors: Julien Mairesse, La Reole (FR); Bernard Cottard, Saint Romain de Colbosc (FR)

(73) Assignee: TOTAL RAFFINAGE FRANCE, Courbevoie (FR)

( * ) Notice: Subject to any disclaimer, the term of this patent is extended or adjusted under 35 U.S.C. 154(b) by 309 days.

(21) Appl. No.: 14/365,901

(22) PCT Filed: Dec. 20, 2012

(86) PCT No.: PCT/FR2012/053023
§ 371 (c)(1),
(2) Date: Jun. 16, 2014

(87) PCT Pub. No.: WO2013/093357
PCT Pub. Date: Jun. 27, 2013

(65) Prior Publication Data
US 2015/0010444 A1    Jan. 8, 2015

(30) Foreign Application Priority Data

Dec. 20, 2011  (FR) ..................... 11 62046

(51) Int. Cl.
| | |
|---|---|
| *B01J 8/00* | (2006.01) |
| *G01F 23/284* | (2006.01) |
| *G01F 23/292* | (2006.01) |

(52) U.S. Cl.
CPC .............. *B01J 8/003* (2013.01); *B01J 8/001* (2013.01); *B01J 8/002* (2013.01); *G01F 23/284* (2013.01);
(Continued)

(58) Field of Classification Search
CPC .............. B01L 9/00; B01L 2200/0647; B01L 2200/143; B01L 2300/0609;
(Continued)

(56) References Cited

U.S. PATENT DOCUMENTS

| | | |
|---|---|---|
| 2004/0031335 A1 | 2/2004 | Fromme et al. |
| 2006/0201245 A1 | 9/2006 | Huber et al. |
| 2010/0019952 A1 | 1/2010 | Poussin |

FOREIGN PATENT DOCUMENTS

| | | |
|---|---|---|
| DE | 101 06 176 A1 | 8/2002 |
| JP | 09-52630 A | 2/1997 |

(Continued)

OTHER PUBLICATIONS

International Search Report for PCT/FR2012/053023, dated Apr. 3, 2013.

*Primary Examiner* — Jill A Warden
*Assistant Examiner* — Dwayne K Handy
(74) *Attorney, Agent, or Firm* — Sughrue Mion, PLLC

(57) ABSTRACT

A process for preparing a reactor (1), said reactor defining an opening (13) for the passage of a device for dispensing solid particles (3) suitable for charging the reactor with solid particles, the process comprising:—providing a sensor support device (2) to which a sensor is attached, said sensor being intended for collecting information on the charging of the reactor,—attaching the sensor support to a component of the reactor (5) different from the device for dispensing solid particles.

11 Claims, 4 Drawing Sheets

(52) U.S. Cl.
CPC ... *G01F 23/292* (2013.01); *B01J 2208/00654* (2013.01); *B01J 2208/00752* (2013.01); *Y10T 29/49345* (2015.01)

(58) Field of Classification Search
CPC . B01L 2300/0627; B01J 8/0015; B01J 8/003; B01J 8/004; B01J 2208/00654; B01J 2208/00752
USPC .................................................. 422/560, 566
See application file for complete search history.

(56) References Cited

FOREIGN PATENT DOCUMENTS

| | | |
|---|---|---|
| WO | 2004/027353 A1 | 4/2004 |
| WO | 2008/047050 A1 | 4/2008 |

SENSOR SUPPORT FOR A REACTOR UNDERGOING CHARGING

CROSS REFERENCE TO RELATED APPLICATIONS

This application is a National Stage of International Application No. PCT/FR2012/053023, filed Dec. 20, 2012, claiming priority from French Patent Application No. 11 62046, filed Dec. 20, 2011, the contents of all of which are incorporated herein by reference in their entirety.

The invention relates to a method of preparing a reactor which has an opening for the passage of a solid particle distribution device adapted to charge the reactor with solid particles, and a sensor support device for a reactor of this type.

There is a known way of charging reactors, notably of the chemical, electrochemical, petroleum or petrochemical type, with solid particles in the divided state. These particles may, for example, take the form of balls, grains, cylinders, disks, rods, or any other shape, and are generally of relatively small size.

The particles can be, in particular, solid catalyst grains, generally extruded and formed either in irregular shapes or in the form of rods with single or multiple lobes, whose dimensions can vary as appropriate from a few tenths of a millimeter to several centimeters.

This application, known as the "dense charging" of catalyst grains in a chemical reactor, will be referred to more specifically in the remainder of the present description. However, the device described is suitable for more general application within the context of the charging of solid particles into a reactor.

"Dense charging" signifies charging a maximum amount of solid particles, as uniformly as possible, in a minimum of space and in a minimum of time, using an optimized shower effect.

Document JP09052630, identified in the preliminary search report carried out for the French application, the priority of which is hereby claimed, describes sensors attached to the inner walls of a reactor for monitoring the charging of the reactor with solid particles.

Documents DE 10106176 and WO2004/027353, also identified in the preliminary search report carried out for the French application, the priority of which is hereby claimed, describe, in one case, a probe attached removably to an upper wall of an enclosure to monitor the emptying of the enclosure, and, in the other case, a support for a probe installed in an opening made in a wall of an enclosure for storing products of the sand or cement type.

Document WO 2010/076522 describes an example of a device for distributing solid particles into an enclosure.

This distribution device is installed in a filling opening of the reactor, located in the center of the top of the reactor.

In order to measure the level of solid particles that have already fallen into the reactor, one or more probes (or sensors) can be placed in the reactor, particularly during filling. More generally, probes are installed in the reactor for the purpose of measuring parameters relating to the solid particles in the enclosure.

It has been envisaged that a probe could be attached to the particle distribution device, and that the assembly formed by the distribution device and the probe could be introduced subsequently into the enclosure through the opening of the enclosure.

There is a need for a method and a device allowing greater flexibility in the positioning of the probe or probes. One of the main constraints with which operators of this type of equipment may be faced arises from the extremely high occupation of space in a reactor, which usually contains plates, thermocouples and supports for these elements, so that there is limited space for maneuvering the device.

A reactor preparation method is proposed for a reactor having an opening for the passage of a solid particle distribution device adapted to charge the reactor with solid particles. The method comprises:
  providing a sensor support device to which is attached a sensor intended for the collection of data on the charging of the reactor,
  attaching the sensor support device to an element of the reactor separate from the solid particle distribution device.

Thus the sensor is attached, advantageously in a removable manner, to an element of the reactor, and not to the particle distribution device, thus reducing the constraints when the solid particle distribution device is introduced into the reactor.

For example, in the case of a plate-type reactor, attachment to the plate may be provided, for example to a longitudinal member of the plate.

Thus the number of plate elements to be raised to allow the introduction of the particle charging device can be smaller than in the prior art, since the occupation of space associated with this particle distribution device is not increased as a result of the attachment of the sensor to this distribution device.

Furthermore, this attachment of the sensor to the plate makes it possible to limit the constraints on the positioning of the sensor.

Advantageously but not exclusively, the sensor support device can be attached by using attachment means comprising two attachment parts, arranged in such a way that these two parts are placed on either side of the reactor element.

Advantageously but not exclusively, the attachment means can be arranged in such a way that these two attachment parts exert forces on two respective opposing surfaces of the reactor element.

These two surfaces may advantageously terminate at (at least) one end of the reactor element, for example an edge of a plate, of a beam, or of another element.

Thus use is made of the presence of an end of a reactor element for the purpose of attaching the sensor support device around this end.

The two parts of the attachment means may, for example, form jaws, such that they grip either side of an edge of the reactor element.

Advantageously but not exclusively, the sensor support device may be positioned on an edge of an opening formed in the plate, near a corner of this opening, to prevent the obstruction of this opening. "Near a corner" signifies that the sensor support device is attached to a side of this opening, at a distance from the end of the side representing a third or less of the length of this side, advantageously a quarter or less, advantageously a fifth or less, and advantageously a tenth or less.

For example, in the case of a single-bed reactor, comprising only one bed of catalyst particles (for example) to be charged, it is possible to provide an attachment to an edge of the reactor enclosure or alternatively to a reactor element separate from the enclosure and from the distribution device, for example a beam extending above the opening, such as a rafter attached to the edge of the reactor or a beam of the reactor building overhanging the reactor opening.

Provision may also be made so that the reactor element to which the first part of the sensor support device is attached comprises a rafter attached to the reactor plate, or an element introduced into the reactor, for example a thermocouple or a hoop.

The reactor element may be installed inside the reactor. For example, it may be a plate, a hoop, a longitudinal member, or other element.

The attachment of the sensor support device to the reactor element may or may not be removable. In the case of a removable attachment, provision may be made, in particular, to withdraw the sensor support device when it is no longer necessary to make measurements with the probe, for example after the whole reactor system has been installed. The attachment may be such that the reactor element is left intact when the sensor support device is withdrawn. The reactor element to which the sensor support has been attached during the filling phase may perform its original function during the reaction phase.

In particular, the attachment may be non-piercing.

The sensor support may thus be attached removably to existing reactor elements, without any need to modify the shape or structure of these elements.

The method may also comprise a step of introducing the solid particle distribution device into the opening, and a step of charging the reactor with solid particles by means of the distribution device. Thus the method of preparing the reactor may result in the charging of the reactor with solid particles.

A sensor support device is proposed for a reactor having an opening for the passage of a solid particle distribution device adapted to charge the reactor with solid particles, the sensor being intended for the collection of data on the charging of the reactor. The sensor support device comprises:

a first part designed to support the sensor, and a second part arranged to attach the first part to an element of the reactor separate from the solid particle distribution device.

Advantageously, the second part of the sensor support device may comprise means for attachment to the reactor element which is separate from the distribution device.

These attachment means may, for example, comprise attachment parts arranged so as to be placed on either side of the reactor element. For example, these attachment means may comprise jaws capable of providing an attachment by clamping on either side of this reactor element, or clip means adapted to provide a clip attachment to this reactor element.

Provision may be made so that, in the absence of an attachment to the reactor element, the second part of the sensor support device is attached to the reactor element, and in particular is made in one piece with the reactor element. For example, the reactor element, for example a longitudinal member, is fitted with two jaw parts intended to be placed on either side of an end of the first part of the sensor support device, and with an eccentric to apply pressure on either side of this end.

Advantageously but not exclusively, in the absence of an attachment to the reactor element, the second part of the sensor support device is fixed to the first part of this device. In particular, the first and second parts may be made in one piece. Thus the sensor support device may incorporate means of attachment to the reactor element, in such a way that the sensor support device can be attached to reactor elements of the type known from the prior art, thus enabling this reactor element to be modified.

Advantageously but not exclusively, the attachment between the first part of the device and the reactor element may be provided by applying a force on either side of the reactor element. Thus the reactor element is not damaged, because there is a temporary attachment.

The invention is not limited in any way to this type of attachment; for example, it would be possible to provide an attachment by screwing, gluing or another method.

Advantageously but not exclusively, the applied force may be provided by clamping, clipping, or another method.

Advantageously but not exclusively, the sensor support device is arranged in such a way that, when the attachment to the reactor element has been provided, the sensor can be spaced apart laterally or in other directions from the reactor element. For example, the probe support device may comprise parts which are movable with respect to each other, so as to allow the sensor to move with respect to the attachment to the reactor element. According to another example, the sensor support device may be arranged so as to prevent any movement of the sensor with respect to the attachment means: a rigid device of this type may, for example, have a specific shape, so that, once attached to the reactor element, the sensor is located at a distance from the opening.

Thus this arrangement may allow space to be freed for the passage of the solid particle distribution device. In particular, if the sensor support device is attached to a plate of the reactor, the sensor may be placed under this plate, thus limiting the occupation of space at the opening of the reactor for the passage of the solid particle distribution device.

Advantageously but not exclusively, the sensor support device is arranged so as to allow the pivoting of at least a portion of this sensor support device so that the sensor can be moved laterally when the sensor support device is attached. Thus, the sensor support device may be attached to the reactor element when the sensor is in a first position, after which a portion of the sensor support device may be pivoted so that the sensor assumes a second position, this second position being advantageously chosen so as to limit the constraints on the installation of other parts, and notably on the installation of the particle distribution device through the opening of the reactor.

In the present application, the terms "top", "bottom", "upper", "lower", "vertical", "horizontal", "lateral", "above", "below", and the like are defined in the conventional sense of these terms; that is to say, the vertical direction is the direction of the gravity vector, this gravity vector being oriented from top to bottom, for a device placed in the expected conditions of use. Clearly, this device may be transported, sold, etc., with a different orientation.

Advantageously but not exclusively, the support device may comprise a shaft and the first part may be arranged in such a way that the sensor is spaced apart from this shaft. The shaft extends in a longitudinal direction. When the sensor support device is attached, the longitudinal direction of the shaft may be close to the vertical direction of the gravity vector. In the present application, in order to avoid over-complicating the description, the term "vertical" may be used instead of the term "longitudinal". For example, reference may be made incorrectly to the vertical shaft of the device although the device may be stored, marketed and even installed in a reactor with its shaft oriented in a direction that is not parallel to that of the gravity vector.

The first part may, for example, comprise a probe support arm fixed to the shaft and extending in a direction having a component not parallel to the longitudinal direction, for example extending in a horizontal plane.

The sensor support device may be arranged so as to allow the first part to be moved with respect to the shaft, for example by translation, pivoting, and/or other movement.

This may provide greater flexibility when different parts are installed in or around the reactor.

In particular, the sensor support may be installed before the solid particle distribution device, since the passage for this solid particle distribution device can be freed subsequently.

More generally, a sensor support device of this type can allow the installation of the sensor support device to be dissociated from the installation of the solid particle distribution device.

The invention is not in any way limited by the spacing of the sensor apart from a vertical passing through the attachment to the reactor element. It is possible, for example, to provide a sensor support that extends vertically, is relatively narrow and is placed in a corner of an opening in a plate so as not to obstruct the passage of the particle distribution device.

Advantageously but not exclusively, the sensor support device may comprise means of attachment to the reactor element, for example jaws, arranged so as to apply a force on either side of the reactor element. The attachment jaw parts may, for example, grip an edge of the plate.

Advantageously but not exclusively, the sensor support device is arranged so as to allow the adjustment of the forces applied by the parts forming the attachment jaw. This may, notably, allow adaptation to reactor elements of various sizes.

Advantageously but not exclusively, first adjustment means may be provided for the coarse adjustment of the parts forming the attachment jaw, as well as second adjustment means for providing finer adjustment of these parts forming the attachment jaw. This may facilitate the attachment to the reactor element, and may notably enable the attachment operation to be performed more quickly.

Advantageously but not exclusively, the first adjustment means may comprise means for attaching the jaw(s) to the shaft of the sensor support device. It is possible, for example, to provide eccentric levers to lock one end of each or at least one part of the jaw onto a vertical axis, for example the shaft, of the sensor support device.

Advantageously but not exclusively, the second adjustment means may comprise at least one screw arranged so as to apply a force having a non-zero component in the direction of the clamping force of the parts forming the jaw. The locking screw may, for example, be placed so as to lie along this clamping direction, in such a way that, when this screw is rotated, the end of the screw bears on a jaw element and on the reactor element.

Advantageously but not exclusively, two screws may be provided for this fine adjustment, each of the screws enabling a force to be applied to the corresponding jaw part. In practice, it is possible to simply use one screw during adjustment, the other screw being provided for safety, in case the first screw is faulty. It is then possible to provide for the adjustment to be made by means of the second screw. This may make it possible to avoid losing time by replacing the parts in case of a fault.

Advantageously but not exclusively, the sensor support device is arranged so as to allow a height adjustment.

Advantageously but not exclusively, the vertical shaft of the sensor support device may comprise two parts mounted slidably with respect to each other, for example two tubes adapted to slide one inside the other. In particular, provision may be made to allow a vertical movement of the tubes with respect to each other, which may allow the height adjustment.

Advantageously, the locking means enable these parts to be locked with respect to each other. For example, the inner tube may be provided with holes and the outer tube may be provided with a pin for locking when the desired height has been reached.

The tubes may have a square or other cross section, but advantageously tubes with a circular cross section will be provided.

Provision may also be made to enable the outer tube to pivot with respect to the inner tube. In particular, the outer tube may be fixed to a part supporting the sensor and extending in a direction having at least one non-vertical component, in such a way that this pivoting may allow the lateral movement of the sensor, and in particular may allow the sensor to be retracted so as to allow a free passage for the solid particle distribution device.

Advantageously but not exclusively, the probe support device may be arranged to allow the sensor to be moved so as to modify the distance of the sensor from the vertical axis.

For example, in the case of a probe support arm extending in a direction having a non-vertical component, for example a probe support arm extending in a horizontal plane, translational adjustment may be provided. In particular, the probe support device may comprise a nut fixing the probe support arm to a vertical shaft, so as to allow the probe support arm to slide in this nut and provide locking once the desired distance between the sensor and the shaft has been reached.

For example, the sensor support device may be arranged so as to allow the sensor support arm to pivot about an axis perpendicular to the axis of the vertical shaft, that is to say about an axis in a horizontal plane. The sensor support arm can thus pivot about this axis between a substantially vertical position, in which the sensor is relatively close to the shaft of the support device, and a horizontal position, in which the sensor is spaced apart from the vertical shaft of the support device.

Advantageously but not exclusively, a gearing and rack system may be provided to control this pivoting. For example, it is possible to provide relatively accessible maneuvering means, for example a square operating key linked by a screw and rack linking piece to a gearing and rack system fixed to the probe support arm. The gearing and rack system can thus be controlled by rotation about a vertical axis.

Advantageously but not exclusively, the probe support device is arranged so as to support a probe weighing more than one kilogram.

A use of the sensor support device described above is also proposed for the charging of a reactor with solid particles, and advantageously for the dense charging of a petrochemical reactor.

A reactor system is also proposed, comprising a reactor, a sensor support device as described above, together with the sensor supported by this device if required.

The invention will be more readily understood with reference to the figures which illustrate embodiments of the invention.

Figure 1:
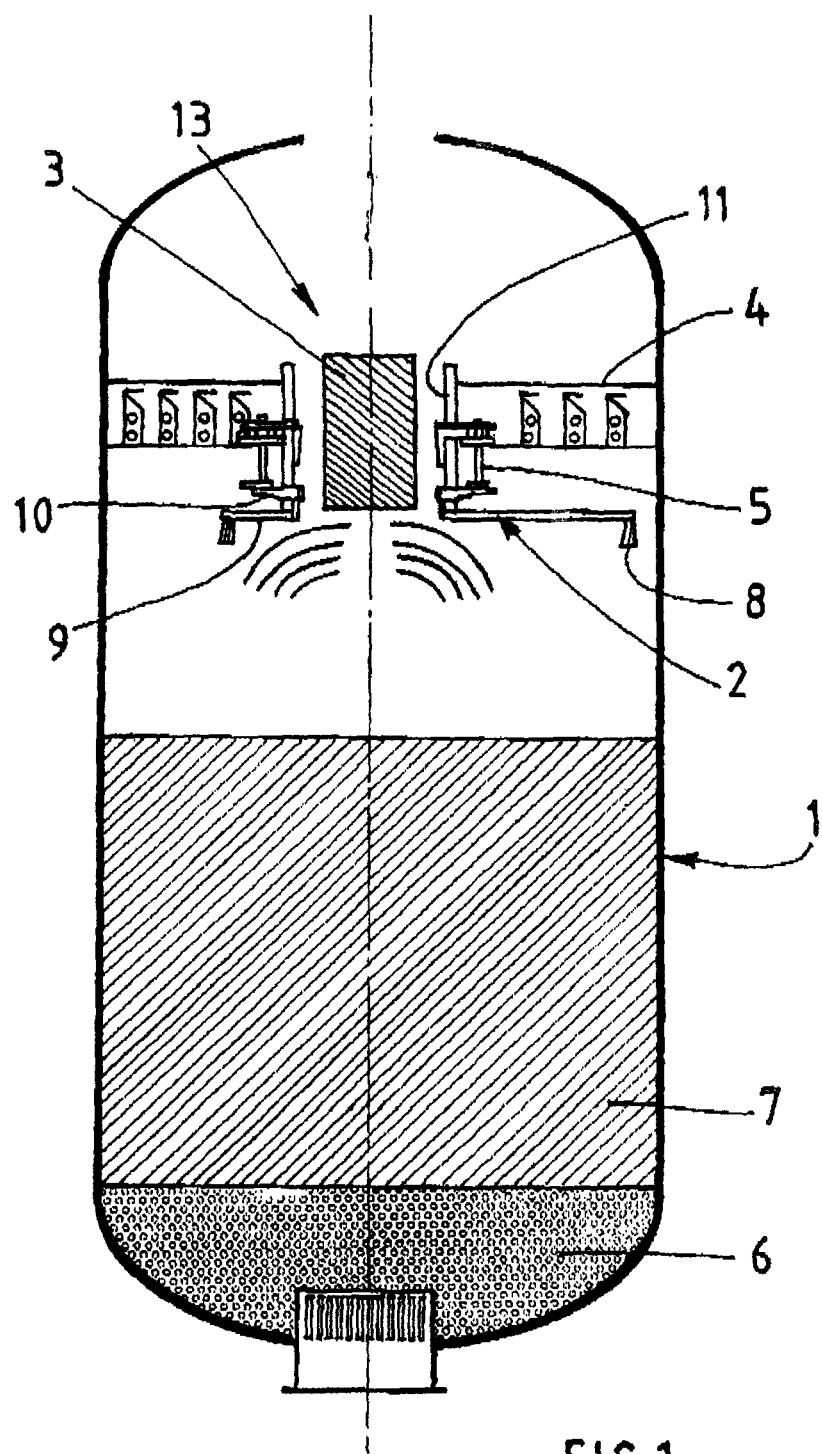
FIG. 1 is a sectional view of an example of a reactor system according to an embodiment of the invention.

With reference to FIG. 1, a reactor 1 has an opening 13 for the passage of a distribution device 3 for solid particles 6, 7. The distribution device 3 may be of the type described in WO 2010/076522.

This reactor 1 has a height of about 5 or 6 meters or more, as appropriate, and its base has a diameter of about 3 or 4 meters or more, as appropriate.

The distribution device 3 enables the reactor 1 to be charged with inert balls 6, and also with catalyst particles 7.

This type of reactor 1 may, notably, be used in the petrochemical industry. For example, it may be a petrochemical reactor in which a hydrocarbon charge flows through the catalyst bed 7 and the bed of inert balls 6. The solid particles of catalyst may be porous extruded balls, usually comprising metallic compounds.

When the catalyst beds 6, 7 have been charged, the distribution device 3 is withdrawn, and a flow of hydrocarbons, which may be liquid and/or gaseous, passes through the reactor 1.

The catalyst beds 6, 7 must be replaced regularly, for example every year or every two years or less often, as appropriate.

For reasons of cost and productivity, it is desirable to limit the preparation time of the reactor 1 as far as possible.

During the charging of the solid particles 6, 7, sensors 8 are installed in the reactor 1 to monitor the progress of the charging of the products charged into the reactor.

The terms "products charged into the reactor" and "charge of the reactor" signify the solid particles distributed in the reactor by the distribution device, for example the beds 6, 7 in FIG. 1; the reagents and products in the chemical sense; and/or other items.

The sensors 8, the number of which may vary from one to four or five as appropriate, may, for example, make it possible to measure the level of the catalyst bed 7, and to detect any variations in level. If the filling surface exhibits a relief pattern, provision may be made to control the distribution of the solid particles in such a way as to correct this relief pattern, for example by imparting a greater velocity to the particles to be charged, so that the particles fill the lateral hollows.

The sensors 8 may, for example, comprise laser sensors, cameras, $H_2S$ sensors, radar sensors, ultrasonic sensors and/or others.

In the case of a laser sensor, the sensor includes laser radiation emission means adapted to emit a signal toward various points of the filling surface, laser receiving means, and processing means (not shown in FIG. 1) for estimating the height of these points on the filling surface.

Each sensor 8 may, for example, be a measuring probe with a height of about 30 centimeters, weighing approximately 2 kilograms or more, as appropriate.

These probes 8 are attached to respective probe supports 2. These probe supports 2 comprise a first part 9, or probe support arm, adapted to support a probe 8. These probe support devices 2 also include a part 11 comprising means of attachment to an element of the reactor. In this case, these attachment means comprise attachment parts 10 forming a jaw, adapted to exert a force on either side of a longitudinal member 5 of a plate 4 of the reactor 1.

The probe support arms 9 are fixed to respective vertical arms, not referenced in FIG. 1, on which the respective jaw parts 10 are mounted.

A probe support device 2 will be described more fully with reference to FIG. 2, which is a more detailed sectional view of an example of this device.

Figure 2:
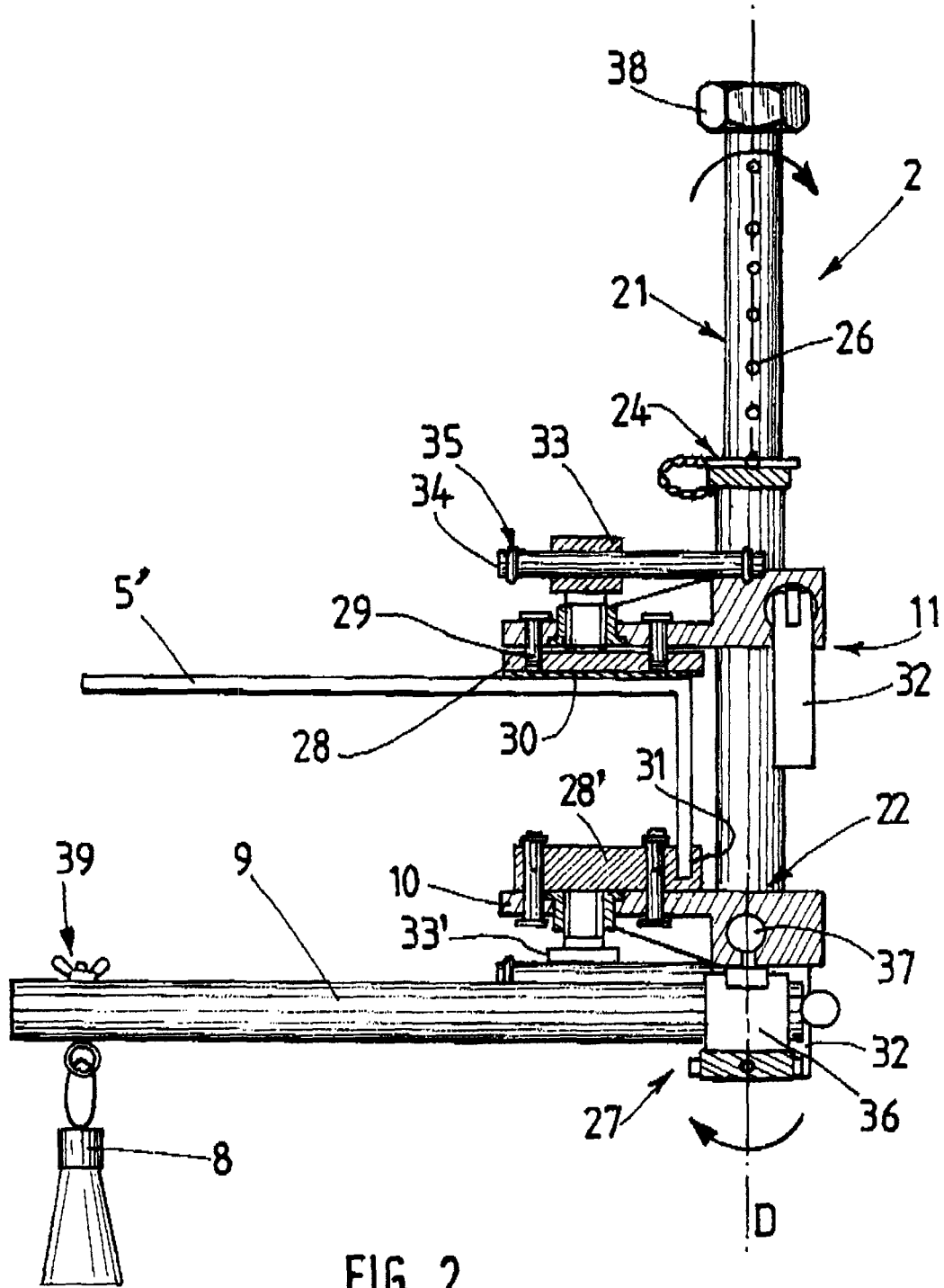
FIG. 2 shows an example of a sensor support device according to an embodiment of the invention.

With reference to this FIG. 2, the probe support device 2 comprises a vertical shaft with an inner tube 21 and an outer tube 22 adapted to slide one inside the other. The inner tube 21 has an outside diameter slightly smaller than the inside diameter of the outer tube 22. The tubes 21, 22 can thus slide vertically with respect to one another, allowing a height adjustment.

The tubes 21, 22 can also pivot with respect to one another about the longitudinal axis D. In this case, the device 2 is oriented in such a way that the longitudinal axis is vertical.

Apertures 26 pierced at regular intervals in the hollow tube 21 allow rapid locking, by means of a linchpin 24, at the desired vertical position.

The probe support device may comprise a clamping system (not shown) to lock the outer tube 22 rotationally when it has been correctly positioned. For example, it is possible to provide two clamping screws (not shown) adapted to apply forces against the outer tube so as to prevent the pivoting of this outer tube with respect to the inner tube, regardless of any vibration. Alternatively, locking by means of an eccentric (not shown) may be provided.

The inner tube 21 extends beyond the end of the outer tube 22.

A stop ring 27 having a diameter greater than the diameter of the outer tube 22 is attached to the inner tube 21. This stop ring enables a fall prevention function to be provided. Even if the pin 24 is not fixed in any of the apertures 26, the stop ring 27 can prevent the tube 22 from falling into the reactor during installation.

The device 2 comprises two jaw parts 10 to apply forces on either side of a reactor beam 5', on respective horizontal surfaces of this beam 5' which are of very different sizes in this example, these horizontal surfaces terminating in a vertical end surface. Base plates 28, 28' are attached to these jaw parts 10 by means of base plate screws 29.

These attachment jaw parts may allow attachment to reactor elements of various shapes. In particular, these jaw parts may allow attachment to elements of variable thickness, thus making them independent, notably, of the different shapes of plates or other surfaces on which they may bear.

Furthermore, the base plates 28, 28' provided between the jaw parts and the reactor element may have a shape adapted to the reactor element. For example, in the case (not shown) of a reactor element with a circular cross section, it is possible to provide base plates designed to adjust the jaw, for example base plates having a surface shape complementary to the surface shape of the circular reactor element.

Returning to FIG. 2, the base plates 28 and 28' may be adapted to the type of reactor beam 5'; for example, the base plate 28 comprises a rubber pad part 30 intended to bear on a flat surface of the beam 5', while the base plate 28' comprises a groove shaped to receive an end 31 of a vertical part of the beam 5'.

It may be noted that this grooved shape of a base plate 28' is suitable not only for attachment to a beam 5' having an end of a vertical part but also for attachment to a beam having a flat lower surface.

Two eccentric levers 32 can be used to lock the two respective jaw parts 10. In fact, each of the jaw parts 10 forms an opening for receiving the outer tube 22. This opening may have a diameter similar to the outside diameter of the tube 22, so as to allow the jaw part 10 to slide on the outer tube 22. Thus, when the eccentric lever 32 is raised, the height of the corresponding jaw part 10 can be adjusted. When the jaw part 10 is in the desired position, the eccentric lever is lowered, thereby locking the jaw part 10 on the tube 22.

After this first coarse adjustment of the position of the jaw parts 10, a finer adjustment can also be provided by means of a locking screw 33. This locking screw can be rotated about a vertical axis, by means of a locking bar 34. This locking bar is relatively long to enable it to be gripped with ease.

As the locking screw is rotated in a given direction, the screw 33 exerts forces on the base plate 28. Thus this screw 33 allows fine adjustment of the forces applied to the reactor beam 5'.

The locking bar 34 is adapted to slide horizontally in an opening of the head of the locking screw 33. Thus the operator causes the locking screw to rotate through a given angular range, and then, when the locking bar approaches the vertical shaft 21, 22, the operator makes this bar slide horizontally, so that the rotation of the locking screw 33 can continue. The sliding locking bar 34 can thus be adapted to the actual degree of occupation of space during the installation of the sensor.

The locking bar 34 is provided with toroidal stop gaskets 35 at its ends to prevent it from falling into the reactor.

The device 2 is also provided with a supplementary locking screw 33', similar to the locking screw 33. This supplementary locking screw 33' is provided for safety, in case the locking screw 33 is faulty.

The first part of the probe support device includes means 39 for attachment to the probe 8, for example a hook fixed in a hole in the probe arm 9 by means of a screw.

An attachment nut 36 allows the probe support arm to be slid in a horizontal plane so as to move the probe 8 toward or away from the tube 22. A locking thumb screw 37 allows the arm 9 to be locked horizontally.

A nut 38 welded on the tube 21 can prevent the loss of the tube 22, together with the jaw parts 10 and the arm 9, during the transportation of the probe support device 2.

Regarding the installation of the probe 8 in the reactor, the procedure described below may be proposed by way of example.

The probe support device 2 is initially introduced into the reactor 1 by the operator. The jaw parts 10 are moved apart from one another, and the operator positions the probe support 2 so that the lower jaw bears on the underside of the beam 5'; for example, a groove in a base plate 28' receives an end 31 of a vertical part of the beam 5'. The upper jaw is then lowered along the tube 22 until it reaches an upper surface of the beam 5'. The eccentric lever 32 is then lowered so as to keep the upper jaw part in this position. The operator then rotates the locking screw 33 until the jaw parts 10 exert sufficient force on the beam 5'. The probe support device is thus attached to the plate.

It is then necessary to position the probe 8.

The inner tube 21 can be lowered or raised with respect to the beam 5'. It is thus possible to provide a height adjustment. Locking means, in this case the pin 24, can be used to lock the tube 22 on the tube 21 with respect to height.

The inner tube 21 can also be pivoted inside the tube 22. The arm 9 being fixed to the tube 21, the operator manipulating the tube 21 can place the sensor 8 under the plate, rather than at the position of the opening. Screws (not shown) can be used to lock this rotation about the axis D.

Finally, the arm 9 can be translated in order to adjust the distance between the probe 8 and this vertical axis D. The screw 37 can be used to lock this translation of the arm 9.

Thus the device 2 provides a certain amount of freedom in the positioning of the probe. This may make it possible to act independently of the positioning constraints in the reactor during installation, thereby improving adaptability to different configurations of the reactor system.

Figure 3:
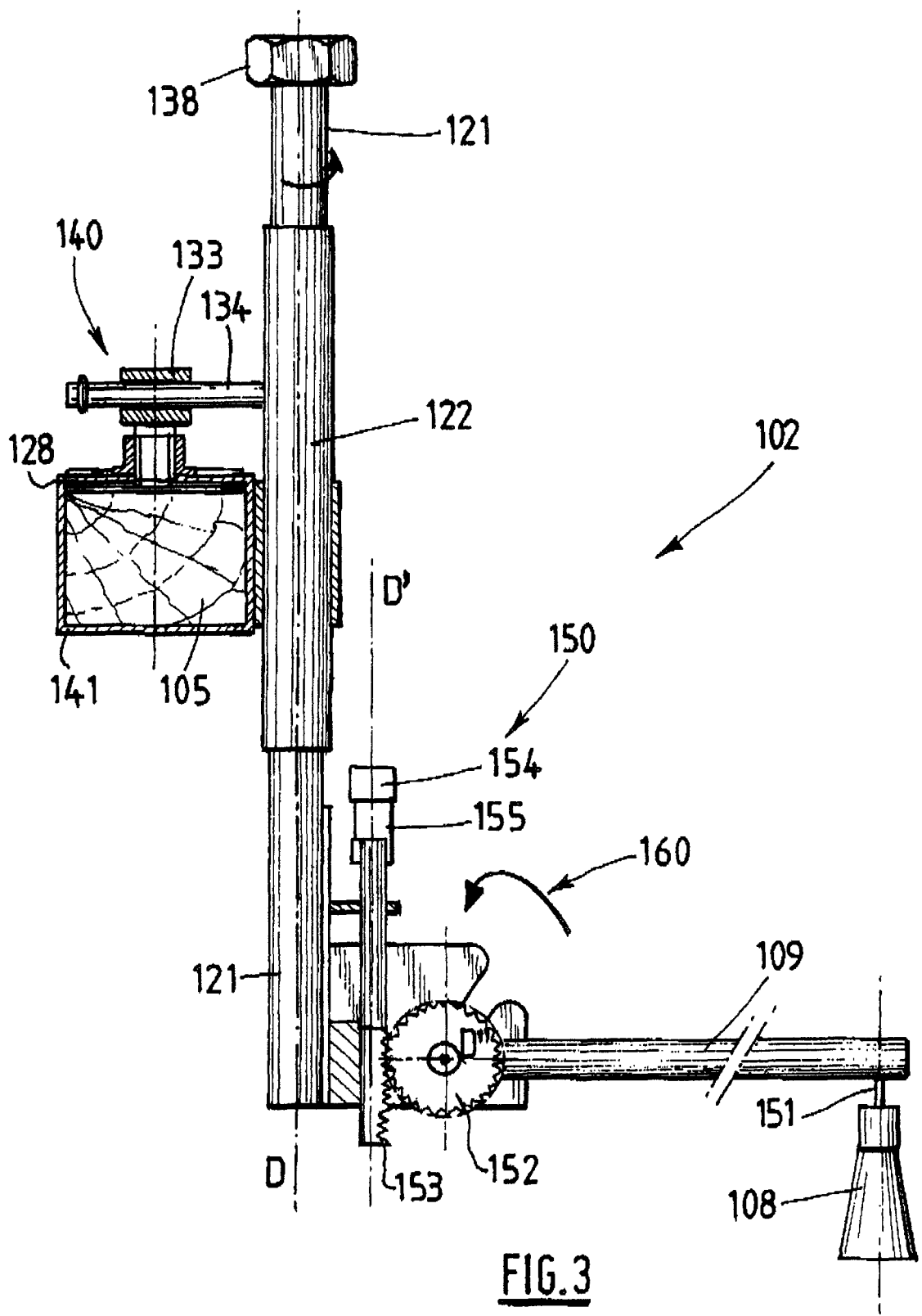
FIG. 3 shows an example of a sensor support device according to another embodiment of the invention.

FIG. 3 is a sectional view of an example of a probe support device according to another embodiment of the invention.

With reference to FIG. 3, the probe support device 102 has two tubes 121, 122 sliding one inside the other.

A means 140 of attachment to an element 105 is mounted on the tube 122.

In the illustrated example, the reactor element 105 comprises a wooden rafter intended to be installed above a reactor plate opening to support a solid particle distribution device.

The means 140 comprises a metal sheet 141 shaped to receive the rafter 105, and a locking screw 133 similar to the locking screw 33 of FIG. 2.

When the user rotates a bar 134 so as to screw in the screw 133, forces are applied to a base plate 128 placed between the rafter 105 and the metal sheet 141. Thus forces are applied on either side of the rafter 105.

The device thus has two attachment parts, namely the lower surface of the metal sheet 141 and the base plate 128, which bear on two opposing surfaces of the rafter 105, in this case the upper and lower surfaces. These surfaces terminate in two vertical end surfaces.

The device 102 further includes a nut 138 at one end of the tube 121 as well as a stop ring (not shown), at a lower end of the tube 121, to prevent the loss of the tube 122 and the elements attached thereto, and also to prevent the loss of a first part 150 comprising the probe support arm and the means of attaching this arm to the tube 121.

As well as in the shape of the means of attachment to the reactor element, the embodiment of FIG. 3 differs from the embodiment of FIG. 2 notably in the possibility of moving the probe support arm 109.

The first part 150 comprises the probe support arm 109 together with a shackle 151 for positioning the probe 108 vertically.

The probe support arm is fixed to a toothed wheel 152 whose teeth engage with a rack 153. The teeth of the rack have a shape such that, when a square operating key 154 and a link piece 155 are made to rotate by an operator about a vertical axis D', the rack 153 causes the toothed wheel 152 to rotate about an axis D'' perpendicular to the plane of the figure, in the direction of the arrow 160. The probe support arm can then pivot between a horizontal position shown in FIG. 3 and a vertical position in which the probe support arm is substantially parallel to the vertical direction.

Regarding the installation of the probe support device, the following procedure may be proposed by way of example:

The probe support device 102 is introduced into the reactor by one or two operators present on the reactor plate. These operators begin by introducing the rafter 105 and the base plate 128 into the metal sheet 141, the clamping screw 133 being in the slackened position, and then manipulate this screw 133 so as to create the attachment.

The height of the tube 122 with respect to the tube 121 is adjusted. Provision may also be made to cause the tube 121 to pivot about the vertical direction D' so as to carry out a first positioning of the probe support part 109. A pin and clamping screws (not shown) then prevent any movement of the tube 122 with respect to the tube 121.

Finally, the operator manipulates the square operating key 154 so as to cause the probe arm to be lowered to the desired position.

The probe support device may also be provided with a safety collar (not shown) designed to be wound around the operator's neck or arm to prevent the support device from accidentally falling into the reactor.

Figure 4:
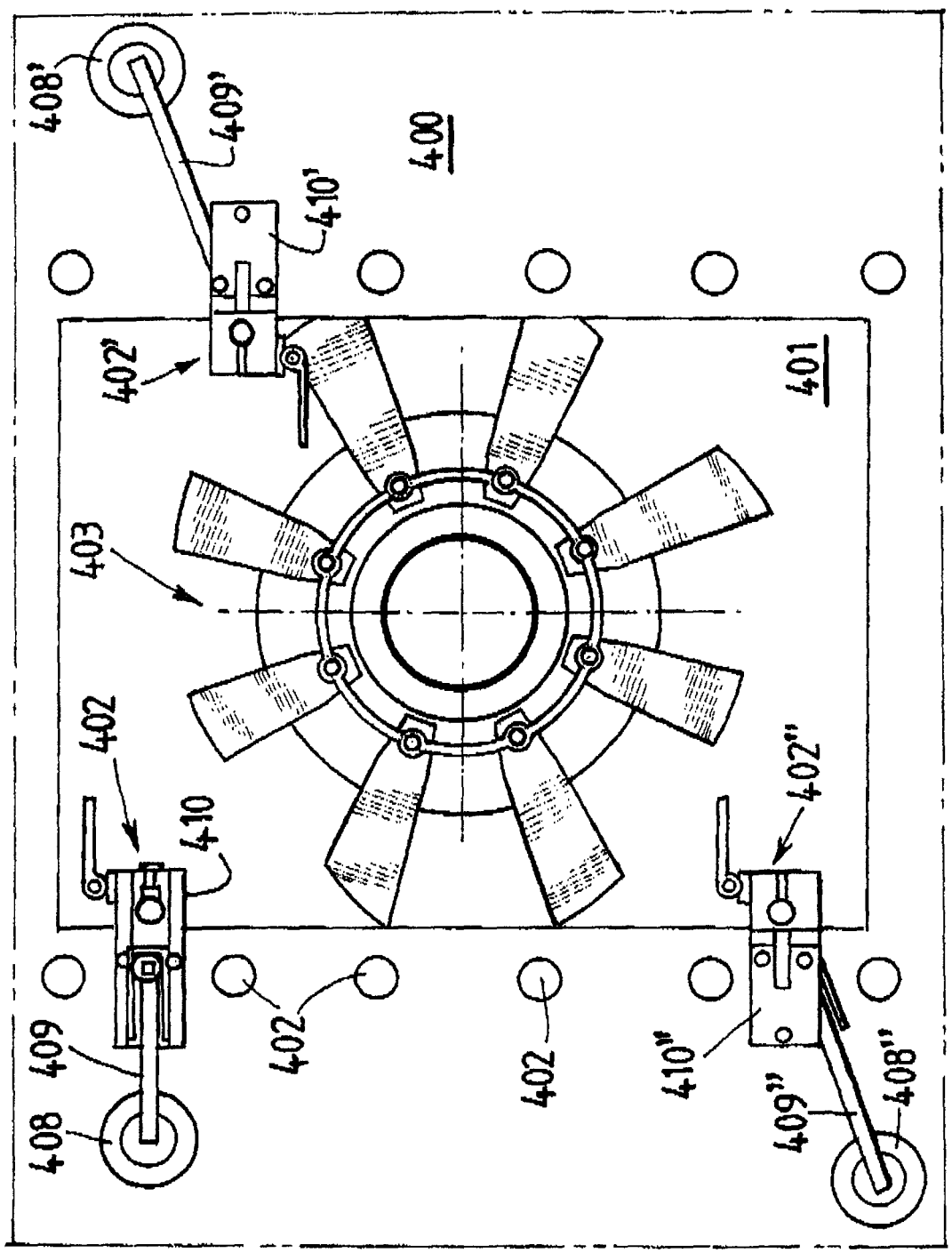
FIG. 4 is a top view of part of an example of a reactor plate system according to an embodiment of the invention.

With reference to FIG. 4, the reactor plate 400 has an opening 401 formed by removing tiles from the plate 400. This opening 401 has a rectangular shape.

The reactor plate includes outflow passages 432 in a known way.

Three sensor support devices 402, 402', 402" have been attached to this reactor plate 400. These reactor support devices comprise jaws 410, 410', 410" clamping the plate 400, together with vertical shafts, perpendicular to the plane of the figure and extending into the reactor. The devices 402, 402', 402" further include respective probe support arms 409, 409', 409" at the ends of which respective probes 408, 408', 408" are suspended. These arms 409, 409', 409" are oriented so as to be placed under the plate and free the space via the opening 401 for the passage of a particle charging device 403.

The probe support devices 409, 409', 409" and the particle distribution device 403 can therefore be installed independently of one another, which may offer greater freedom of maneuvering during installation.

Furthermore, by avoiding the attachment of the probe support devices to the particle distribution device, it is possible to avoid the removal of further tiles or plates, since the occupation of space by the system to be introduced via the opening 401 is relatively small.

The probe support device therefore allows relatively fast and easy installation and a degree of adaptability to the various situations that may be encountered.

In a variant that is not shown, the sensor support device may comprise graduation means to allow the operator to evaluate the orientation of the outer tube. These graduation means may, for example, comprise a marker fixed to the inner tube and adapted to move with respect to a mark fixed to the outer tube.

The invention claimed is:

1. A method of preparing a reactor, said reactor having an opening for the passage of a device for distributing solid particles adapted to charge the reactor with solid particles, comprising:
    providing a reactor having a plate with a longitudinal member, said plate being separate from the solid particle distribution device, wherein the plate is inside the reactor,
    introducing via the opening the solid particle distribution device within the reactor, and before or after this step,
    introducing via the same opening a sensor support device having an attachment means forming a jaw and including a sensor within the reactor, said sensor being configured to collect data on the charging of the reactor, and
    attaching the sensor support device in a removable manner via the attachment means to the longitudinal member of the reactor plate separate from the solid particle distribution device,
    wherein the sensor support device, when installed, is entirely within the reactor, and
    the sensor support device is not attached to the solid particle distribution device.

2. The method as claimed in claim 1, wherein the sensor support device is attached to an edge of an opening formed in the plate, near a corner of said opening.

3. The method as claimed in claim 1, additionally comprising:
    charging the reactor with solid particles by means of the distribution device.

4. A reactor system comprising:
    a reactor having an opening for the passage of a device for distributing solid particles adapted to charge the reactor with solid particles and a plate with a longitudinal member, said plate being separate from the solid particle distribution device, wherein said plate is inside the reactor,
    the solid particle distribution device,
    a sensor configured to collect data on the charging of the reactor, and
    a sensor support device comprising:
    a first part designed to support the sensor, and
    a second part arranged to provide a removable attachment of the first part to the longitudinal member of said reactor plate, wherein the second part includes an attachment means having a jaw, arranged so as to apply a for on either side of the longitudinal member of said reaction plate,
    wherein the sensor support device, when installed, is entirely within the reactor, and
    the sensor support device is not attached to the solid particle distribution device.

5. The reactor system as claimed in claim 4, comprising:
    first adjustment means to provide coarse adjustment of the attachment means on either side of the reactor plate, and
    second adjustment means to provide fine adjustment of the force applied to the reactor plate.

6. The reactor system as claimed in claim 4, wherein the sensor support device is arranged so that, once the first part has been attached to the reactor plate, the sensor can be spaced apart laterally from the attachment to said reactor plate.

7. The reactor system as claimed in claim 6, wherein:
    the second part includes a shaft extending in a longitudinal direction, and
    the first part comprises a probe support arm fixed to the shaft and extending in a direction having a component not parallel to the longitudinal direction.

8. The reactor system as claimed in claim 7, wherein:
    the probe support arm is mounted pivotably about an axis having a component not parallel to the longitudinal direction.

9. The reactor system as claimed in claim 7, wherein the probe support arm is mounted slidably with respect to the shaft, so as to allow translational movements in a direction having a component not parallel to the longitudinal direction.

10. The reactor system as claimed in claim 7, wherein the shaft comprises an inner tube and an outer tube, the inner tube being mounted in the outer tube so as to be pivotable about the longitudinal axis.

11. The reactor system as claimed in claim 4, wherein the sensor support device comprises at least two parts mounted slidably with respect to one another in a direction of height, and locking means for locking said parts with respect to one another as regards their height.

* * * * *